United States Patent
Madduri et al.

(10) Patent No.: US 12,218,550 B2
(45) Date of Patent: Feb. 4, 2025

(54) ELECTRIC MACHINE THERMAL MANAGEMENT ASSEMBLY AND METHOD

(71) Applicant: Ford Global Technologies, LLC, Dearborn, MI (US)

(72) Inventors: Bharath Madduri, Canton, MI (US); Dengfu Zhang, Northville, MI (US); Chin-Yuan Perng, Ann Arbor, MI (US); William Guarino, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 17/736,554

(22) Filed: May 4, 2022

(65) Prior Publication Data

US 2023/0361640 A1   Nov. 9, 2023

(51) Int. Cl.
| | |
|---|---|
| *H02K 1/32* | (2006.01) |
| *B60L 50/51* | (2019.01) |
| *H02K 5/20* | (2006.01) |
| *H02K 9/19* | (2006.01) |

(52) U.S. Cl.
CPC .............. *H02K 1/32* (2013.01); *B60L 50/51* (2019.02); *H02K 5/20* (2013.01); *H02K 9/19* (2013.01); *B60L 2240/425* (2013.01)

(58) Field of Classification Search
CPC .. H02K 1/32; H02K 5/20; H02K 9/19; H02K 7/003; H02K 5/04; H02K 5/203; B60L 50/51; B60L 2240/425
USPC ...................................................... 310/61, 54
See application file for complete search history.

(56) References Cited

U.S. PATENT DOCUMENTS

| | | | |
|---|---|---|---|
| 7,211,913 B2 | 5/2007 | Tsutsui et al. | |
| 8,896,167 B2 | 11/2014 | McKinzie et al. | |
| 9,735,654 B2 | 8/2017 | Stridsberg | |
| 2011/0169353 A1* | 7/2011 | Endo | H02K 1/32 |
| | | | 310/59 |
| 2013/0334912 A1* | 12/2013 | Tokunaga | H02K 9/19 |
| | | | 310/54 |
| 2017/0310189 A1 | 10/2017 | Hanumalagutti et al. | |
| 2021/0135533 A1 | 5/2021 | Samie et al. | |

(Continued)

FOREIGN PATENT DOCUMENTS

| | | |
|---|---|---|
| DE | 102020125689 A1 | 5/2021 |
| JP | 4492745 B2 | 6/2010 |
| WO | PCTEP2021065807 | † 12/2021 |

*Primary Examiner* — Ahmed Elnakib
(74) *Attorney, Agent, or Firm* — David B. Kelley; Carlson, Gaskey & Olds, P.C.

(57) ABSTRACT

An electrical machine assembly includes a shaft rotatable about an axis of an electric machine and first and second endcaps mounted to the shaft. The first endcap includes a first endcap coolant channel. The second endcap includes a second endcap coolant channel. A rotor is mounted to the shaft axially between the first and second endcaps. The rotor includes first rotor coolant channels and second rotor coolant channels. The first rotor coolant channels are configured to communicate liquid coolant that is received from the first endcap coolant channel axially through the rotor in a first direction. The second rotor coolant channels are configured to communicate liquid coolant that is received from the second endcap coolant channel axially through the rotor in a second direction that is opposite the first direction.

17 Claims, 4 Drawing Sheets

(56) References Cited

U.S. PATENT DOCUMENTS

2021/0391762 A1\* 12/2021 Chen .................. H02K 9/19
2023/0299642 A1† 9/2023 Kunatharaju \* cited by examiner
† cited by third party

ELECTRIC MACHINE THERMAL MANAGEMENT ASSEMBLY AND METHOD

TECHNICAL FIELD

This disclosure relates generally to managing thermal energy within an electric machine.

BACKGROUND

Electrified vehicles differ from conventional motor vehicles because electrified vehicles include a drivetrain having one or more electric machines. In some electrified vehicles, the electric machines can drive the electrified vehicles instead of, or in addition to, an internal combustion engine. Electric machines are also used in pumps, machine tools, household appliances, power tools, and in many other devices.

SUMMARY

In some aspects, the techniques described herein relate to an electrical machine assembly, including: a shaft rotatable about an axis of an electric machine; first and second endcaps mounted to the shaft, the first endcap including a first endcap coolant channel, the second endcap including a second endcap coolant channel; and a rotor mounted to the shaft axially between the first and second endcaps, the rotor including a plurality of first rotor coolant channels and a plurality of second rotor coolant channels, the plurality of first rotor coolant channels configured to communicate liquid coolant that is received from the first endcap coolant channel axially through the rotor in a first direction, the plurality of second rotor coolant channels configured to communicate liquid coolant that is received from the second endcap coolant channel axially through the rotor in a second direction that is opposite the first direction.

In some aspects, the techniques described herein relate to an electric machine assembly, wherein the first and second rotor coolant channels each extend axially from the one of the first or the second endcap to the other of the first or the second endcap.

In some aspects, the techniques described herein relate to an electrical machine assembly, wherein the first and second rotor coolant channels each have a triangular cross-sectional profile.

In some aspects, the techniques described herein relate to an electrical machine assembly, wherein the first rotor coolant channels are circumferentially offset from the second rotor coolant channels.

In some aspects, the techniques described herein relate to an electrical machine assembly, wherein the first endcap coolant channel includes an annular portion and a plurality of spoke portions that extend radially outward from the annular portion to one of the first rotor coolant channels.

In some aspects, the techniques described herein relate to an electrical machine assembly, wherein the first and second endcap coolant channels each open to the rotor.

In some aspects, the techniques described herein relate to an electrical machine assembly, wherein the plurality of first rotor coolant channels are configured to communicate coolant axially in the first direction from the first endcap on a first axial side of the rotor, to a plurality of exit openings within the second endcap on an opposite second axial side of the rotor, wherein the plurality of second rotor coolant channels are configured to communicate coolant axially in the second direction from the second endcap on the second axial side of the rotor to a plurality of exit openings within the first endcap on the first side of the rotor.

In some aspects, the techniques described herein relate to an electrical machine assembly, wherein the first and second rotor coolant channels are radially outer coolant channels, and further including a plurality of radially inner coolant channels.

In some aspects, the techniques described herein relate to an electrical machine assembly, wherein the plurality of radially inner coolant channels are formed within the shaft.

In some aspects, the techniques described herein relate to an electrical machine assembly, wherein the plurality of radially inner coolant channels are configured to communicate liquid coolant axially to the first and second endcap coolant channels.

In some aspects, the techniques described herein relate to an electrical machine assembly, wherein the shaft includes a plurality of radially extending bores that are each configured to communicate liquid coolant from the shaft to one of the radially inner coolant channels.

In some aspects, the techniques described herein relate to an electrical machine assembly, wherein the plurality of radially extending bores are disposed equidistant from the first endcap and the second endcap.

In some aspects, the techniques described herein relate to an electrical machine assembly, wherein the plurality of radially extending bores are disposed at an axial center of the rotor.

In some aspects, the techniques described herein relate to an electrical machine assembly, wherein the radially inner coolant channels communicate some of the liquid coolant received from one of the radially extending bores in the first direction, and communicate some of the liquid coolant received from the one of the radially extending bores in the second direction.

In some aspects, the techniques described herein relate to an electric machine thermal management method, including: communicating liquid coolant that is received from a first endcap of an electric machine in a first direction through a plurality of first rotor coolant channels within a rotor of the electric machine; and communicating liquid coolant that is received from a second endcap of the electric machine in an opposite second direction through a plurality of second rotor coolant channels within the rotor of the electric machine.

In some aspects, the techniques described herein relate to an electric machine thermal management method, wherein the first and second rotor coolant channels are radially outer coolant channels, and further including communicating liquid coolant to the first and second endcaps through a plurality of radially inner coolant channels.

In some aspects, the techniques described herein relate to an electric machine thermal management method, further including communicating liquid coolant to the plurality of radially inner coolant channels from a shaft of the electrical machine through a plurality of radially extending bores within the shaft.

In some aspects, the techniques described herein relate to an electric machine thermal management method, wherein the plurality of radially extending bores are disposed equidistant from the first endcap and the second endcap.

In some aspects, the techniques described herein relate to an electric machine thermal management method, wherein the radially inner coolant channels communicate some of the liquid coolant received from one of the radially extending bores in the first direction, and communicate some of the liquid coolant received from the one of the radially extending bores in the second direction.

In some aspects, the techniques described herein relate to an electric machine thermal management method, wherein the plurality of first rotor coolant channels are configured to communicate coolant axially in the first direction from the first endcap on a first axial side of the rotor, to a plurality of end-windings on an opposite second axial side of the rotor, wherein the plurality of second rotor coolant channels are configured to communicate coolant axially in the second direction from the second endcap on the second axial side of the rotor, to a plurality of end-windings on the first side of the rotor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary assemblies and methods for managing thermal energy levels within an electric machine, and particularly a rotor of the electric machine. A coolant circuit within the electric machine can communicate coolant through the electric machine in a way that facilitate, among other things, evenly cooling the electric machine.

A rotor of an electric motor is typically a rotating part of the electric motor that rotates due magnetic fields. The rotation of the rotor develops a torque about an axis of the rotor. During the rotation of the rotor, thermal energy levels in the electric machine can increase due to, among other things, changing magnetic fields. Conventionally, a coolant (lubricating oil or lube oil) is circulated through the electric motor. The coolant can move along a coolant circuit within the electric motor. The coolant cools and lubricating the rotor and other components, such as stator end windings and permanent magnets of the electric motor.

Figure 1:
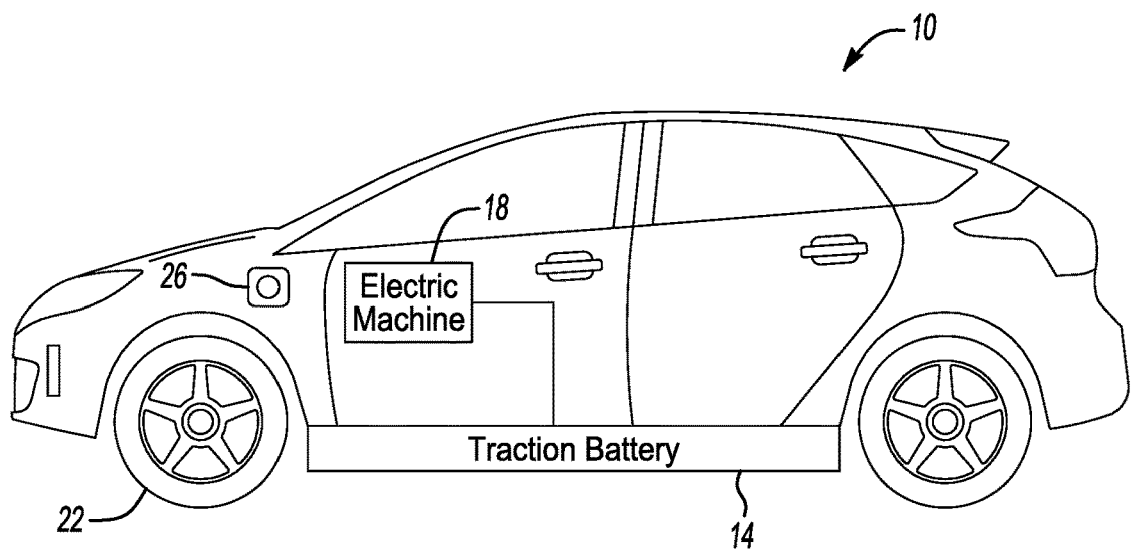
FIG. 1. illustrates a side view of an electrified vehicle having a traction battery and an electric machine.

With reference to FIG. 1, an electrified vehicle 10 includes a traction battery 14, an electric machine 18, and wheels 22. The traction battery 14 powers the electric machine 18, which converts electrical power to torque to drive the wheels 22.

The electrified vehicle 10 includes a charge port 26. The electrified vehicle 10 can be electrically coupled an external power source through the charge port 26. The traction battery 14 can be recharged from the external power source.

The traction battery 14 is, in the exemplary embodiment, secured to an underbody of the electrified vehicle 10. The traction battery 14 could be located elsewhere on the electrified vehicle 10 in other examples.

The electrified vehicle 10 is an all-electric vehicle. In other examples, the electrified vehicle 10 is a hybrid electric vehicle, which can selectively drive wheels using torque provided by an internal combustion engine instead, or in addition to, an electric machine. Generally, the electrified vehicle 10 can be any type of vehicle having a traction battery and an electric machine.

Figure 2:
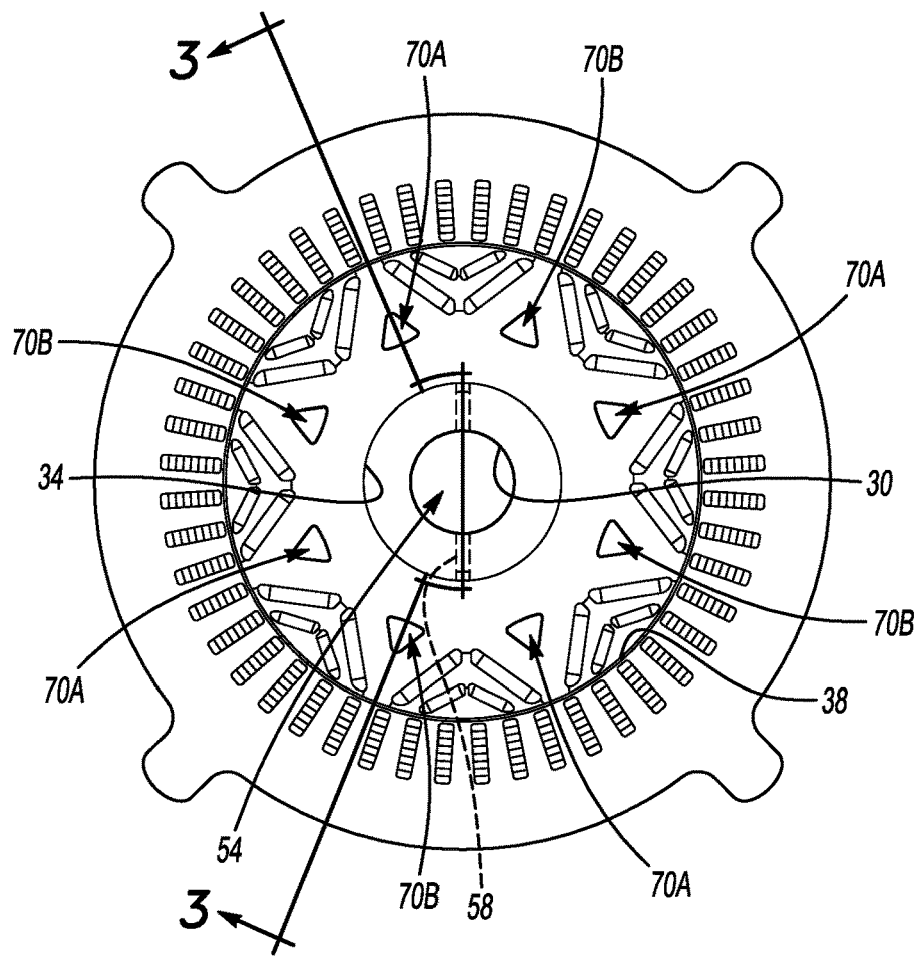
FIG. 2 illustrates an end view of the electric machine of FIG. 1 with an endcap removed.
Figure 3:
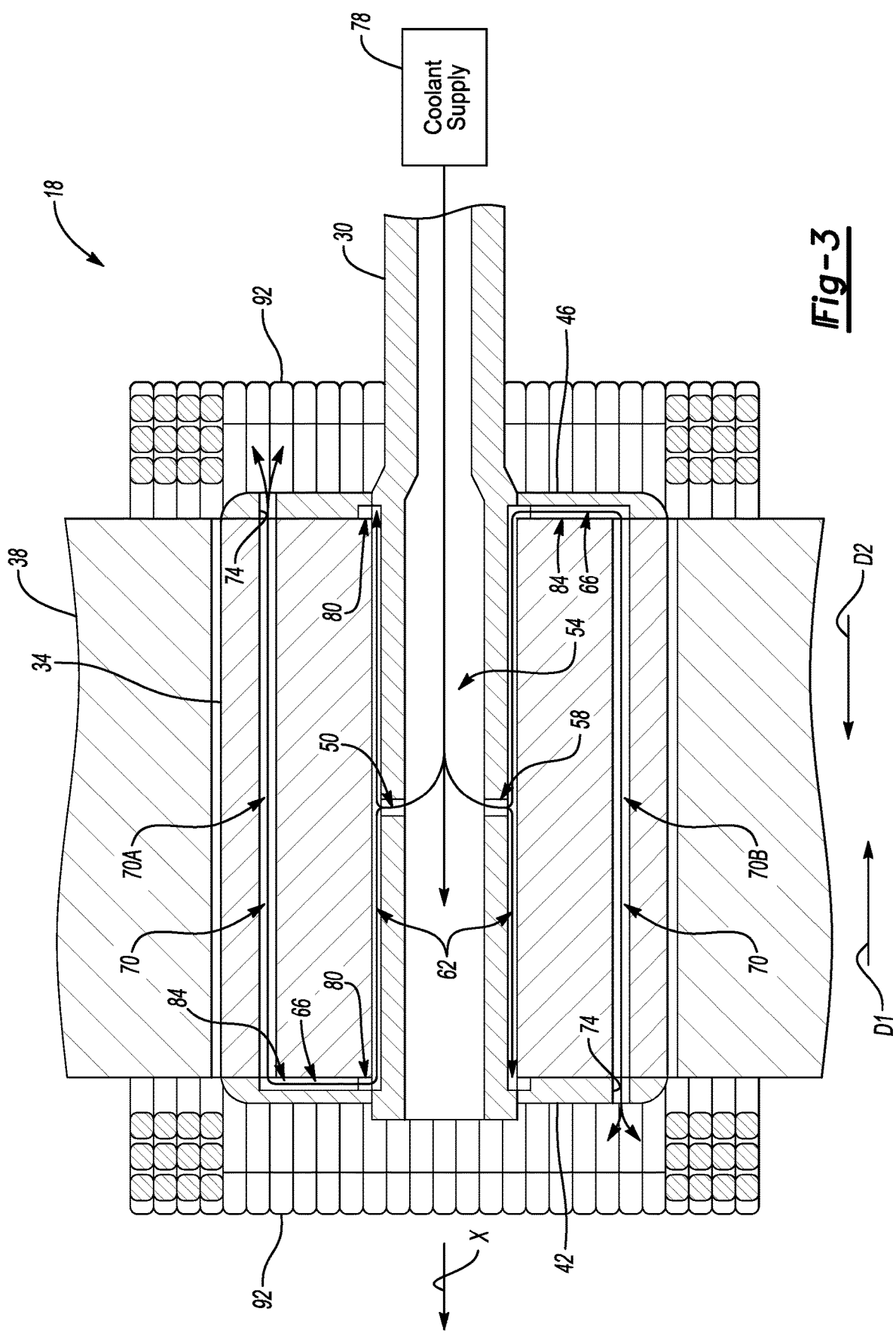
FIG. 3 illustrates a section view taken at line 3-3 in FIG. 2.

With reference now to FIGS. 2 and 3, the electric machine 18 includes a shaft 30, a rotor 34, a stator 38, a first endcap 42, and a second endcap 46. The rotor 34 is mounted to the shaft 30 between the first endcap 42 and the second endcap 46. The shaft 30, the rotor 34, the first endcap 42, and the second endcap 46 are configured to rotate together about an axis X of the electric machine 18. The first endcap 42 is located near a bearing (not shown). The second endcap 46 is located near the point from where the lube oil enters the shaft 30.

Figure 4:
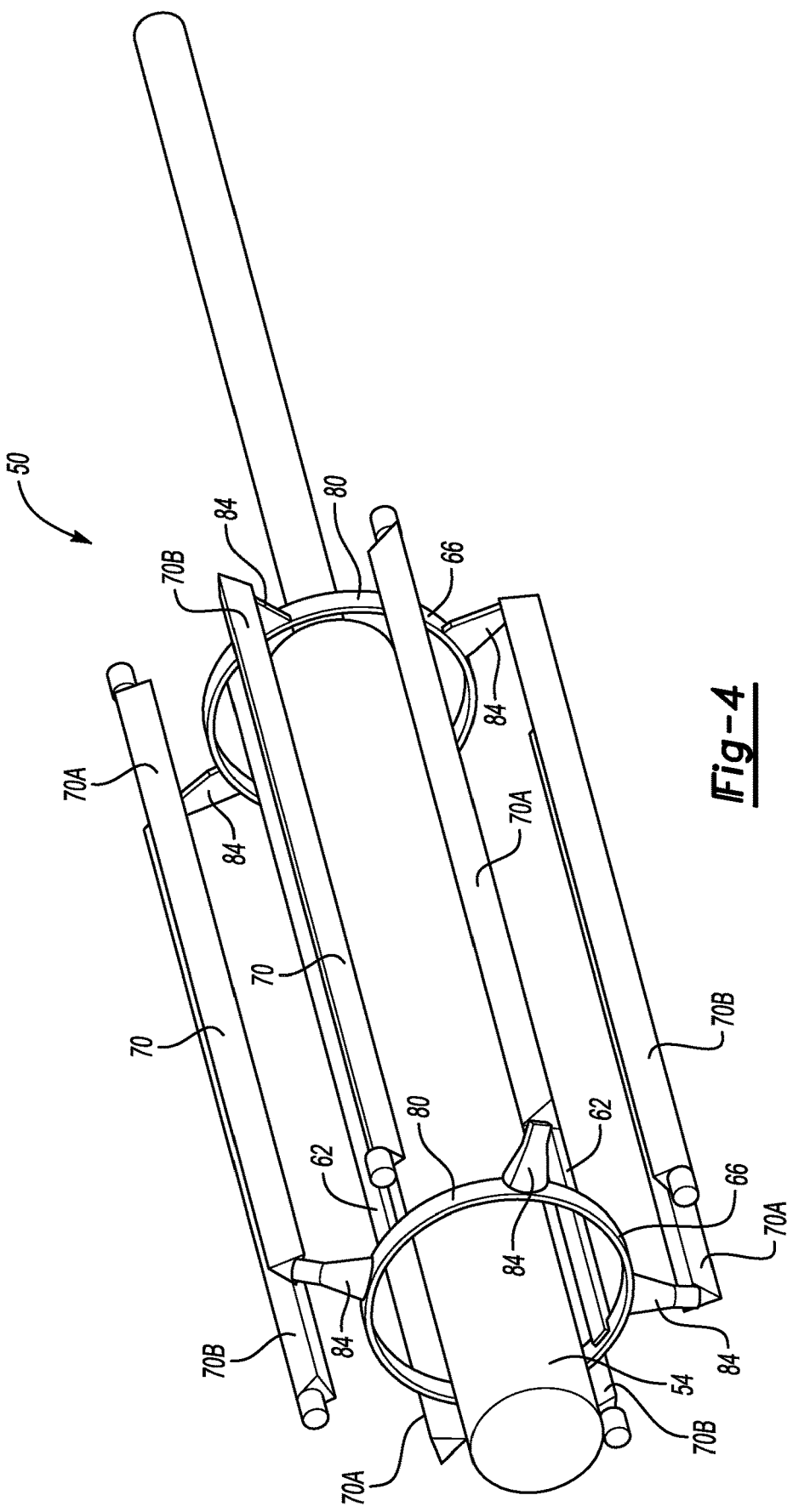
FIG. 4 illustrates a perspective view of a coolant circuit from the electric machine of FIGS. 2 and 3.
Figure 5:
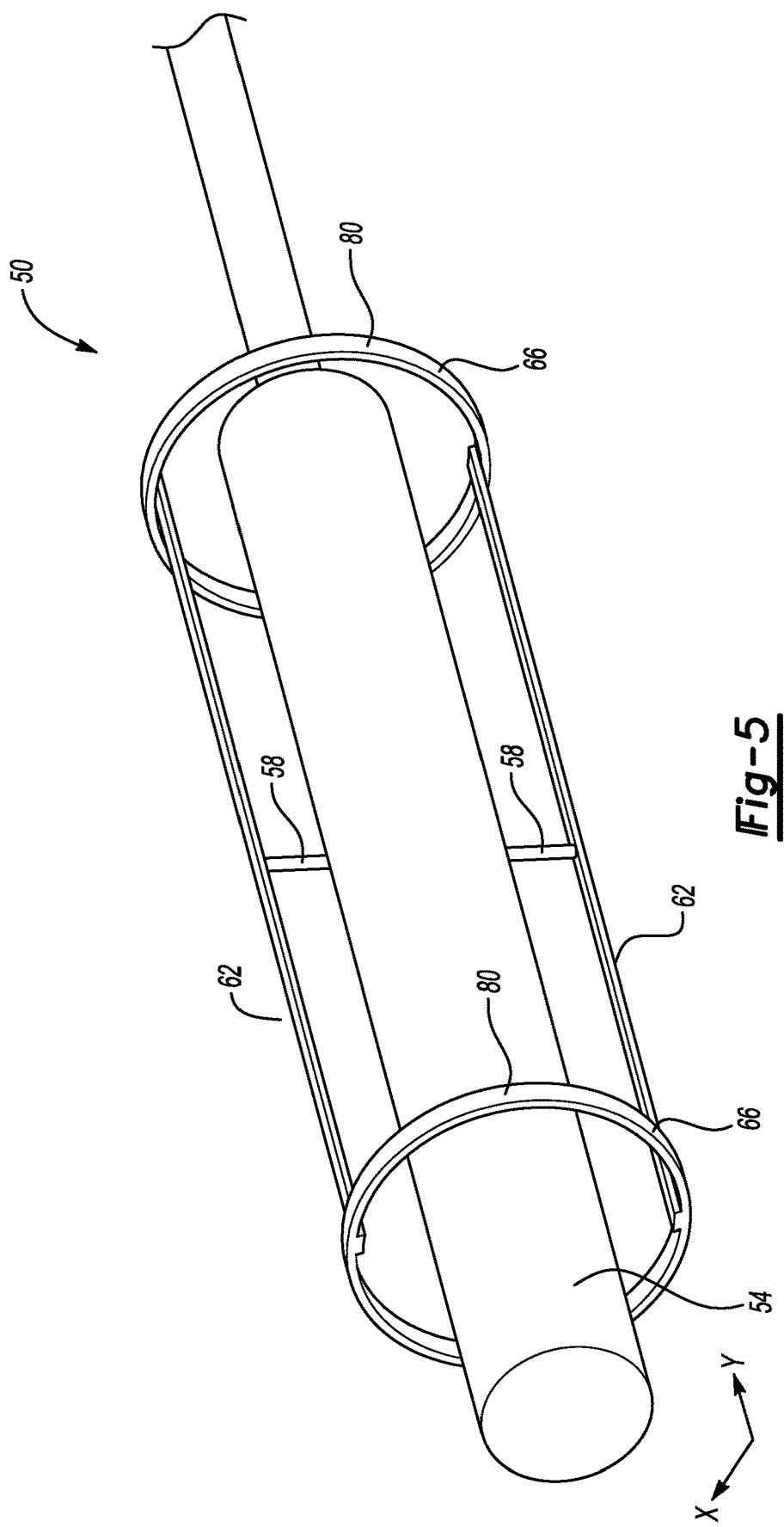
FIG. 5 illustrates the perspective view of FIG. 4 with selected portions of the coolant circuit removed.

Referring now to FIGS. 4 and 5 with continuing reference to FIGS. 2 and 3, the electric machine 18 includes a coolant circuit 50. A liquid coolant can be moved along the coolant circuit 50 to manage thermal energy levels within the electric machine 18.

The shaft 30 is a hollow shaft that has a shaft channel 54. Coolant, such as a liquid coolant, can be communicated from the shaft channel 54 through a plurality of radially extending bores 58, through at least one radially inner coolant channel 62, through at least one endcap coolant channel 66, through at least one radially outer coolant channel 70, and then through an endcap exit opening 74. The coolant can be communicated to the shaft channel 54 of the shaft 30 from a coolant supply 78.

In this example, the radially extending bores 58 are disposed equidistant from the first endcap 42 and the second endcap 46, and are at an axial center of the rotor 34. The radially extending bores 58 receive coolant from the shaft channel 54, and communicate the coolant radially to one of the radially inner coolant channels 62.

The radially inner coolant channels 62 are, in this example, grooves within the shaft 30. In another example, the radially inner coolant channels 62 could be provided, or partially provided, by grooves in the rotor 34.

The grooves with the shaft 30 open radially outward. The radially inner coolant channels 62 have a rectangular cross-sectional profile in this example. Within the radially inner coolant channels 62 some of the coolant moves in an axial direction D1 between the shaft 30 and the rotor 34 toward the first endcap 42, and some of the coolant moves in an axial direction D2 between the shaft 30 and the rotor 34 toward the second endcap 46. The axial direction D1 is opposite the axial direction D2.

The endcap coolant channel 66 within the first endcap 42 receives the coolant that has moved in the axial direction D1 from the radially inner coolant channels 62. The endcap coolant channel 66 within first endcap 42 receives the coolant that has moved in the axial direction D1 from the radially inner coolant channels 62. The endcap coolant channel 66 within second endcap 46 receives the coolant that has moved in the axial direction D2 from the radially inner coolant channels 62. From the endcap coolant channels 66, the coolant is delivered to the radially outer coolant channels 70.

The endcap coolant channels 66 are open to the rotor 34. The endcap coolant channels 66 each include an annular portion 80 and a plurality of spoke portions 84. The annular portion 80 is radially aligned with the radially inner coolant channels 62 and is disposed about the axis X. The spoke portions 84 extend radially from the annular portion 80 to the radially outer coolant channels 70. In this example, the spoke portions 84 taper downward moving radially outward away from the annular portion 80.

The radially outer coolant channels 70 each have a triangular cross-sectional profile. The radially outer coolant channels 70 are circumferentially distributed about the axis X. The radially outer coolant channels 70 are radially outside the radially inner coolant channels 62. The radially outer coolant channels 70 can be repurposed air channels of the rotor 34.

The radially outer coolant channels 70 include a plurality of first radially outer coolant channels 70A, and a plurality of second radially outer coolant channels 70B. The plurality of first radially outer coolant channels 70A are circumferentially offset from the plurality of second radially outer coolant channels 70B.

The plurality of first radially outer coolant channels 70A each receive coolant from one of the spoke portions 84 of the endcap coolant channel 66 in the first endcap 42. The plurality of first radially outer coolant channels 70A communicate the coolant axially in the axial direction D1 from the first endcap 42 on a first axial side of the rotor 34 to the second endcap 46 on an opposite second axial side of the rotor 34. The coolant then moves through one of the endcap exit openings 74 in the second endcap 46 and sprays onto windings 92 of the electric machine 18.

The plurality of second radially outer coolant channels 70B each receive coolant from one of the spoke portions 84 of the endcap coolant channel 66 in the second endcap 46. The plurality of second radially outer coolant channels 70B communicate the coolant axially in the axial direction D2 from the second endcap 46 on a second axial side of the rotor 34 to the first endcap 42 on the first axial side of the rotor 34. The coolant then moves through one of the endcap exit openings 74 in the second endcap 46 and sprays onto the windings 92 of the electric machine 18.

The coolant circuit 50 facilitates evenly distributing coolant within the electric machine 18 and particularly the rotor 34. Also, the flow bias at relatively elevated rotor speeds can be reduced or eliminated when using the exemplary coolant circuit of this disclosure.

Features of the disclosed examples include a coolant supply system that can facilitate temperature reductions in the rotor material and nearby components, such as magnets.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An electrical machine assembly, comprising: a shaft rotatable about an axis of the electrical machine;
    first and second endcaps mounted to the shaft, the first endcap including a first endcap coolant channel, the second endcap including a second endcap coolant channel; and
    a rotor mounted to the shaft axially between the first and second endcaps, the rotor including a plurality of first radially outer rotor coolant channels, a plurality of second radially outer rotor coolant channels, and a plurality of radially inner rotor coolant channels,
        the plurality of first radially outer rotor coolant channels configured to communicate liquid coolant that is received from the first endcap coolant channel axially through the rotor in a first direction,
        the plurality of second radially outer rotor coolant channels configured to communicate liquid coolant that is received from the second endcap coolant channel axially through the rotor in a second direction that is opposite the first direction,
        the plurality of radially inner coolant channels each configured to communicate some of the liquid coolant axially to the first endcap coolant channel and some of the liquid coolant axially to the second endcap coolant channel wherein each of the radially inner coolant channels within the plurality of radially inner coolant channels opens to both the first endcap and the second endcap.

2. The electrical machine assembly of claim 1, wherein the plurality of first radially outer coolant channels and the plurality of second radially outer rotor coolant channels each extend axially from the one of the first or the second endcap to the other of the first or the second endcap.

3. The electrical machine assembly of claim 1, wherein the plurality of first radially outer coolant channels and the plurality of radially outer second rotor coolant channels each have a triangular cross-sectional profile.

4. The electrical machine assembly of claim 1, wherein the plurality of first radially outer rotor coolant channels are each circumferentially offset from the plurality of second radially outer rotor coolant channels.

5. The electrical machine assembly of claim 1, wherein the first endcap coolant channel includes an annular portion and a plurality of spoke portions that extend radially outward from the annular portion to one of the first rotor coolant channels.

6. The electrical machine assembly of claim 1, wherein the first and second endcap coolant channels each open to the rotor.

7. The electrical machine assembly of claim 1, wherein the plurality of first radially outer rotor coolant channels are configured to communicate coolant axially in the first direction from the first endcap on a first axial side of the rotor, to a plurality of exit openings within the second endcap on an opposite second axial side of the rotor, wherein the plurality of second radially outer rotor coolant channels are configured to communicate coolant axially in the second direction from the second endcap on the second axial side of the rotor to a plurality of exit openings within the first endcap on the first side of the rotor.

8. The electrical machine assembly of claim 1, wherein the plurality of radially inner coolant channels are formed within the shaft.

9. The electrical machine assembly of claim 1, wherein the shaft includes a plurality of radially extending bores that are each configured to communicate liquid coolant from the shaft to one of the radially inner coolant channels.

10. The electrical machine assembly of claim 9, wherein the plurality of radially extending bores are disposed equidistant from the first endcap and the second endcap.

11. The electrical machine assembly of claim 9, wherein the plurality of radially extending bores are disposed at an axial center of the rotor.

12. The electrical machine assembly of claim 1, wherein each of the radially inner coolant channels within the plurality of radially inner coolant channels extends from the first endcap to the second endcap.

13. The electrical machine assembly of claim 1, wherein each of the radially inner coolant channels with the plurality of radially inner coolant channels extends axially from the first endcap to the second endcap.

14. An electric machine thermal management method, comprising:
communicating liquid coolant that is received from a first endcap of the electric machine in a first direction through a plurality of first radially outer rotor coolant channels within a rotor of the electric machine;
communicating liquid coolant that is received from a second endcap of the electric machine in an opposite second direction through a plurality of second radially outer rotor coolant channels within the rotor of the electric machine; and
communicating liquid coolant to the first and second endcaps through a plurality of radially inner coolant channels, the radially inner coolant channels each communicating some of the liquid coolant in the first direction, and communicating some of the liquid coolant in the second direction wherein each of the radially inner coolant channels within the plurality of radially inner coolant channels extends from the first endcap to the second endcap.

15. The electric machine thermal management method of claim 14, further comprising communicating liquid coolant to the plurality of radially inner coolant channels from a shaft of the electrical machine through a plurality of radially extending bores within the shaft.

16. The electric machine thermal management method of claim 15, wherein the plurality of radially extending bores are disposed equidistant from the first endcap and the second endcap.

17. The electric machine thermal management method of claim 14, wherein the plurality of first radially outer rotor coolant channels are configured to communicate coolant axially in the first direction from the first endcap on a first axial side of the rotor, to a plurality of end-windings on an opposite second axial side of the rotor, wherein the plurality of second radially outer rotor coolant channels are configured to communicate coolant axially in the second direction from the second endcap on the second axial side of the rotor, to a plurality of end-windings on the first side of the rotor.

* * * * *